Sept. 11, 1951 W. O. MILLIGAN ET AL 2,567,296
PREPARATION OF A FISCHER-TROPSCH CATALYST
Filed June 6, 1949
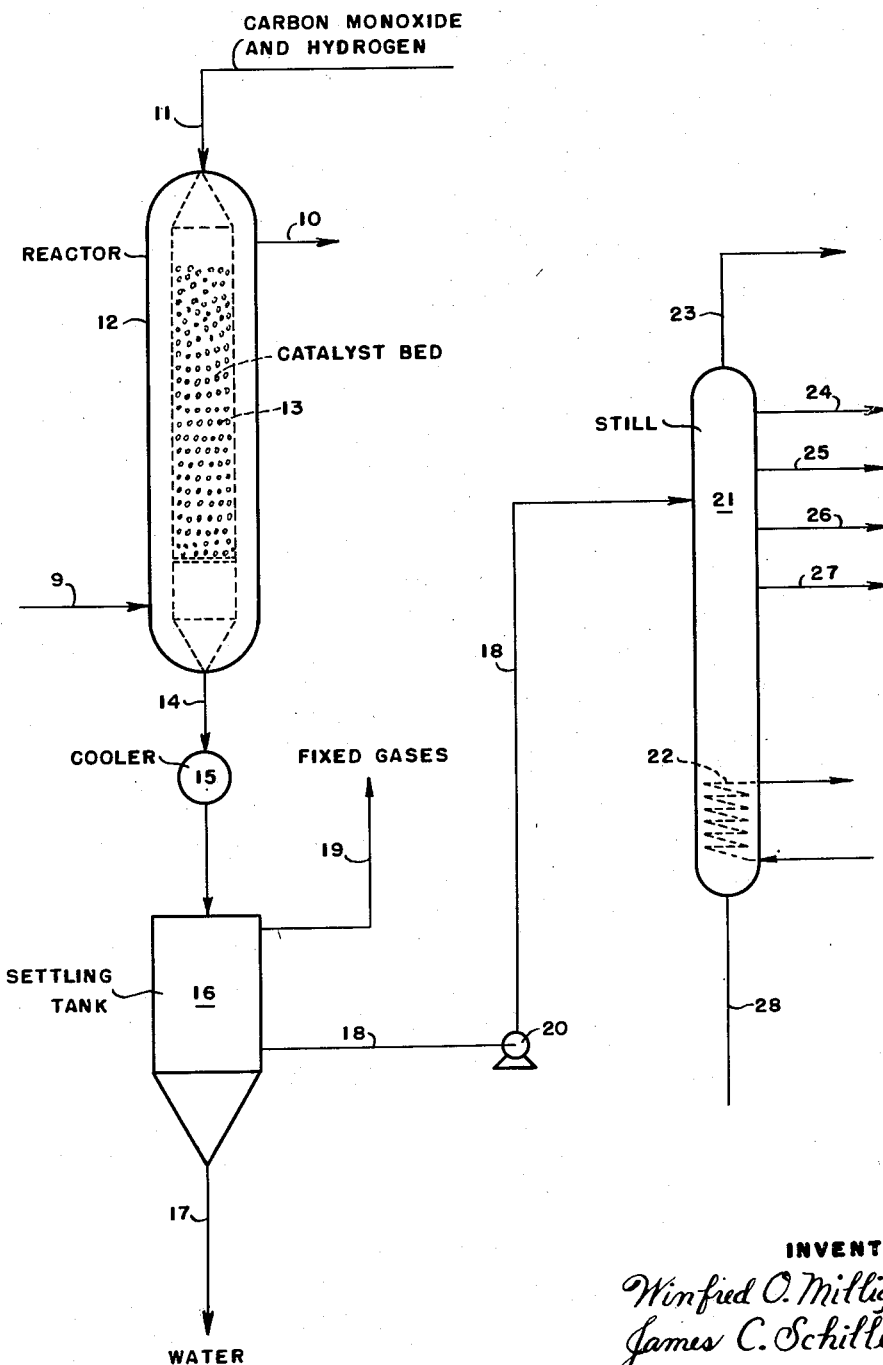
INVENTORS.
Winfred O. Milligan,
James C. Schiller,
BY
AGENT.

Patented Sept. 11, 1951

2,567,296

UNITED STATES PATENT OFFICE 2,567,296

PREPARATION OF A FISCHER-TROPSCH CATALYST

Winfred O. Milligan, Houston, and James C. Schiller, Baytown, Tex., assignors, by mesne assignments, to Standard Oil Development Company, Elizabeth, N. J., a corporation of Delaware Original application January 3, 1949, Serial No. 69,068. Divided and this application June 6, 1949, Serial No. 97,436

4 Claims. (Cl. 252—474)

The present invention is directed to an improved method for effecting the synthesis of hydrocarbons and oxygenated organic compounds from carbon monoxide and hydrogen.

This application is a division of U. S. Serial No. 69,068, filed January 3, 1949, entitled "Method for Synthesis of Hydrocarbons and Oxygenated Compounds," which is a continuation-in-part of U. S. Serial No. 686,468, filed July 26, 1946, now abandoned, and entitled "Synthesis of Hydrocarbons and Oxygenated Organic Compounds."

It is well known to the art to produce hydrocarbons by the reaction of carbon monoxide and hydrogen in the presence of a catalyst and under well defined conditions of temperature, pressure, and contact time, these conditions being adjusted for the particular type of catalyst being employed. The products obtained by the reaction of carbon monoxide and hydrogen also vary in type, configuration, and molecular weight depending upon the type of catalyst employed. Paraffinic and olefinic hydrocarbons are the usual products obtained in a reaction of this type; byproducts consist chiefly of water, oxygenated compounds and carbon monoxide. Experience has shown that the oxygenated compounds are predominantly alcoholic in nature and that small amounts of esters, organic acids, ketones and aldehydes are usually also formed.

Workers in the prior art have disclosed processes for hydrogenating carbon monoxide to produce hydrocarbons using catalysts such as sintered iron promoted with an alkali metal compound and reduced in a hydrogen atmosphere, or by the reduction or oxidation of iron or of metals of the iron group in mixtures of hydrogen and steam. The crystal structure of the several iron oxides is well known from the results of X-ray diffraction examination. The prior art workers have also employed as catalysts for the Fischer synthesis process reduced $Fe_3O_4$ or reduced alpha ferric oxide; these catalysts were prepared by reducing promoted $Fe_3O_4$ crystals directly or by reducing alpha $Fe_2O_3$ crystals.

In accordance with the present invention, carbon monoxide and hydrogen are brought into contact with an iron oxide type catalyst under suitable temperatures and pressures to produce high yields of hydrocarbons as well as oxygenated organic compounds. The iron oxides are prepared as the catalyst in accordance with the present invention by introducing in the manufacture thereof the step of an intermediate formation of gamma $Fe_2O_3$ crystals. Further, in the preparation of the catalyst, a compound comprising an element selected from the alkali metals, such as potassium oxide, is admixed with the iron oxide to engender and stabilize the gamma ferric oxide crystalline structure. The mixture of gamma $Fe_2O_3$ crystals and stabilizing agent is subjected to a reducing atmosphere at superatmospheric temperatures before it is employed as the catalytic agent. It is to be emphasized that the intermediate formation of gamma ferric oxide from $Fe_3O_4$ and its subsequent reduction to metallic iron or lower iron oxides constitutes a new and improved step in the manufacture of active catalyst for liquid hydrocarbon synthesis.

Accordingly, the present invention may be described briefly as involving the contacting of a mixture of hydrogen and carbon monoxide with a catalyst which is obtained by subjecting to a reducing atmosphere at superatmospheric temperatures $Fe_2O_3$ in the form of gamma ferric oxide crystals, with the feed gases being maintained under temperature and pressure conditions to cause the formation of substantial amounts of hydrocarbons and oxygenated hydrocarbons.

It is preferred to contact the mixture of hydrogen and carbon monoxide with the catalyst at a temperature in the range of 450° to 675° F. and at a pressure within the range of 10 to 600 pounds per square inch gauge. It is also desirable for the hydrogen and carbon monoxide to be present in ratios within the range of 2:1 to 1:1 and to use feed rates within the range of 1 to 1500 gaseous volumes of feed per volume of catalyst per hour.

In the process of the present invention, the iron oxide in the gamma crystalline form before reduction should be stabilized in order to prevent conversion of the gamma ferric oxide crystals into a less desirable material such as the alpha ferric oxide crystals at the high temperatures required for the reduction of the catalyst. The iron oxide may be stabilized in the form of gamma oxide crystals by preparing a mixture comprising a major portion of $Fe_2O_3$ in the form of gamma oxide crystals and a minor portion of a compound derived from an alkali metal. Examples of stabilizing materials which may be admixed with the $Fe_2O_3$ are potassium carbonate, sodium carbonate, potassium hydroxide, potassium oxide, and the carbonates, oxides, and hydroxides of the other alkali metals as illustrated, for example, by lithium and sodium hydroxides as well as rubidium and caesium as the oxide, hydroxides, or carbonates. It is desirable to add from 1 to 15 weight per cent of stabilizing material of the alkali metal compound, based on the iron oxide, in order to stabilize the iron oxide in the gamma form.

The catalytic mass comprising reduced $Fe_2O_3$ in the form of gamma oxide crystals and a stabilizing agent comprising an alkali compound, prior to reduction, may be formed in any convenient manner and employed in the practice of the present invention. As one method for producing the catalytic mass, iron oxide in the form of $Fe_3O_4$ may be admixed with an aqueous solution of a compound containing an alkali metal added in an amount within the range from 1 to 15 per cent, based on the iron oxide and the mass mixed to form a paste. The resulting paste may be dried, and then heated in the presence of oxygen at a temperature in the range from about 750° to about 1400° F., the resultant mass being then reduced with hydrogen gas at a temperature within the range of 750° to 1400° F.

As another method for obtaining a catalytic mass comprising reduced iron oxide derived from $Fe_2O_3$ in the gamma crystalline form, a ferrous chloride solution may be contacted with pyridine to obtain a complex. The complex mass is then dissolved in water and contacted with a stream of air to oxidize it to gamma ferric oxide monohydrate. The gamma ferric oxide monohydrate may then be admixed with a compound containing an alkali or an alkaline earth metal in an amount within the range of 1 to 15%, based on the anhydrous iron oxide. The mixture may then be subjected to a suitable temperature to dehydrate the oxide and to obtain a mixture of $Fe_2O_3$ in the form of gamma iron oxide crystals and an alkali or alkaline earth metal-containing compound. Prior to employment of the catalyst, it is preferred to subject the dehydrated mass to a reduction operation in the presence of hydrogen at a temperature within the range from about 750° to 1400° F. to obtain an active catalyst.

The practice of the present invention may now be described by reference to the drawing which is a single figure in the form of a flow diagram showing a mode of practicing one embodiment thereof.

Turning now specifically to the drawing, a mixture of carbon monoxide and hydrogen at the pressure desired for the synthesis reaction is passed through an inlet line represented by the numeral 11 into reactor 12. Within reactor 12 is arranged a catalyst mass 13 which has been prepared by the reduction of $Fe_2O_3$ in the form of gamma ferric oxide crystals and containing a stabilizing amount of an alkali metal compound. Since the reaction of carbon monoxide and hydrogen is exothermic, tremendous amounts of heat are evolved during the reaction and must be removed from the catalyst bed 13. In order to maintain the temperature of the catalyst bed within the limits required for optimum conversion, a space is provided between reactor bed 13 and vessel 12 and a suitable fluid is passed into the space by inlet line 9 and withdrawn through outlet 10 for controlling the temperature of the catalyst bed.

The effluent from the catalyst bed 13 containing unreacted carbon monoxide and hydrogen, hydrocarbons and oxygenated compounds such as alcohols, carbon dioxide and water, is removed through line 14 and passes through a cooling means 15 wherein the major portion of hydrocarbons and water are liquefied. The mixture is withdrawn from cooling means 15 and discharged into a settling means 16 where the total mixture is separated into a hydrocarbon phase and a water phase. Water is withdrawn continuously from settler 16 through line 17 and the hydrocarbon layer is withdrawn continuously through line 18. Non-condensible materials contained in the effluent may be withdrawn from the top of settling means 16 through line 19; these exit gases may be conducted to a separation means, not shown, in order to recover unreacted carbon monoxide and hydrocarbon for recycling to the reaction 12 or may be recycled to the reactor as such.

The liquid hydrocarbon layer is passed through line 18 containing pump 20 and discharged into a distilling means 21, heat being supplied by heating coils 22 to heat the hydrocarbons therein. Hydrocarbon fractions suitable for use as motor fuels, diesel fuel or components of lubricating oils may be withdrawn from distilling means 21 through lines 23, 24, 25, 26 and 27. A heavy bottoms fraction is withdrawn through line 28 and may be employed as a lubricating oil or as a fuel oil.

It will be recognized by those skilled in the art that the hydrocarbons withdrawn from distillation unit 21 may be employed for many purposes. For example, light olefins, boiling in the range of $C_4$ and $C_5$ hydrocarbons may be alkylated with an isoparaffin, such as isobutane, in the presence of a suitable catalyst to produce a high octane motor fuel. Also, the liquid fractions obtained in the synthesis process may be hydrogenated to improve the stability and octane characteristics thereof. It is to be pointed out that it may be desirable to recover oxygenated organic compounds from both the water and hydrocarbon phases removed from settler 16; the more water-soluble oxygenated hydrocarbons will be present in the water phase whereas the high molecular weight oxygenated compounds which are relatively insoluble in water will be present in the hydrocarbon phase.

While the above discussion has described a method for carrying out the synthesis reaction in the presence of catalysts employing a fixed bed operation, it is to be pointed out that other methods for carrying out the aforesaid synthesis reaction may at times be desirable. For example, the catalyst may be employed in the form of a suspension in a gaseous stream and passed through the reaction zone. The technique for carrying out reactions in a suspension of catalyst, commonly designated as a fluidized catalyst, are well known and accordingly the details of such an operation will not be given here. The catalyst employed in the process of our invention lends itself well to use either in the form of pellets or pills for the fixed bed type of operation or to use as a finely divided powder suspended in a gaseous stream in the fluid catalytic synthesis operation.

The advantages to be obtained in the practice of our invention will now be described by the following examples:

*Example I*

Pulverized black ferroso-ferric oxide was treated with various amounts of $K_2CO_3$, the latter material being added as an aqueous solution comprising 105 grams $K_2CO_3$ per liter of solution. The thick paste resulting from admixture of the oxide and aqueous solution was mulled and dried in a circulating oven at a temperature of about 225° F. for about 48 hours. The dried material was then pulverized, pelleted into 1/8" pills, heated for about 4½ hours at a temperature of about 1000° F. in the presence of air and cooled in the presence of air. The resulting $Fe_2O_3$ samples containing various amounts of $K_2CO_3$ (reported as per cent $K_2O$) were then examined by X-ray diffraction procedures well known to the art. The diffraction patterns thus obtained were compared with X-ray diffraction patterns obtained on samples of pure alpha $Fe_2O_3$ and gamma $Fe_2O_3$, respectively. The following results were obtained:

| Wt. percent $K_2O$ (added as $K_2CO_3$) in Iron Oxides | Results of X-Ray Examination of Promoted Iron Oxides |
|---|---|
| 0.2 | Standard Alpha $Fe_2O_3$ pattern. |
| 0.5 | Standard Alpha $Fe_2O_3$ pattern with a few extra lines. |
| 1.0 | Alpha $Fe_2O_3$ and gamma $Fe_2O_3$ pattern with weak, sharp additional lines. |
| 2.0 | Gamma $Fe_2O_3$ plus little alpha $Fe_2O_3$. Sharp additional lines. |
| 5.0 | Gamma $Fe_2O_3$ plus little alpha $Fe_2O_3$. Sharp additional lines. |
| 10.0 | Gamma $Fe_2O_3$ plus little alpha $Fe_2O_3$. Sharp additional lines. |

It will be seen that the present of below about 1.0 per cent by weight of $K_2O$ (added as $K_2CO_3$) in the oxidized iron oxide resulted in the preparation of crystals showing predominantly the alpha oxide structure whereas above this amount, the crystals were predominantly in the gamma oxide form.

*Example II*

In this example, the pellets comprising alpha iron oxide and 0.2 weight per cent $K_2O$ prepared as described in Example I were reduced in the presence of dry hydrogen gas for four hours at a temperature of about 900° F. and at atmospheric pressure, the hydrogen feed rate being maintained at 1000 volumes per volume of promoted iron oxide pellets per hour. A mixture comprising hydrogen and carbon monoxide in a ratio of 1:1 was then passed over the catalyst at a feed rate of 225 volumes per volume of catalyst per hour and at a pressure of 150 pounds per square inch gauge. The temperature of the catalyst bed was carefully controlled at 550° F. The products were segregated into a water phase, a liquid phase comprising hydrocarbons and oxygenated hydrocarbons, and a gaseous phase comprising unreacted feed, $CO_2$, and gaseous hydrocarbons. The yield of $C_4$ and heavier products was found to be 146 cc. per cubic meter of CO and $H_2$ charged and 177 cc. per cubic meter of CO and $H_2$ consumed. The selectivity, determined as the ratio of $C_4$ and heavier products to $C_1$ and heavier products times 100 was determined to be 64.8.

*Example III*

In this example, the pellets comprising gamma ferric oxide and 5.0 weight per cent $K_2O$ prepared as described in Example I were reduced by dry hydrogen under the same conditions mentioned in Example II. Likewise, a CO and $H_2$ mixture was passed over the reduced catalyst under the same operating conditions employed in Example II. The yield of $C_4$ and heavier products was determined to be 227 cc. per cubic meter of CO and $H_2$ charged and 245 cc. per cubic meter of CO and $H_2$ consumed. The selectivity, calculated as described in Example II, was found to be 91.3. The water phase resulting from the above operaton was analyzed and found to contain the equivalent of 3.8 cc. alcohols (calculated as ethyl alcohol) per cubic meter of CO and $H_2$ consumed. Water insoluble alcohols were present in the liquid hydrocarbon phase.

It is seen, therefore, that the use of an iron oxide catalyst promoted and stabilized with above 5.0 weight per cent $K_2O$ (added as $K_2CO_3$) and prepared by the reduction of gamma $Fe_2O_3$ results in the synthesis of larger quantities of useful products than does the use of a catalyst prepared by reduction of alpha ferric oxide used in Example II.

*Example IV*

A mixture comprising a major portion of $Fe_2O_3$ in the form of gamma oxide crystals and 2.0 weight per cent $K_2O$ (added as $K_2CO_3$) prepared a described in Example I and reduced by the procedure described in Example II was employed as a synthesis catalyst. A mixture of $H_2$ and CO in a ratio of 1.24:1 was passed over the catalyst at a rate of 144 volumes per volume of catalyst per hour, a temperature of 550° F., and a pressure of 150 pounds per square inch gauge. The products were segregated and measured and the yields of $C_4$ and heavier products based respectively on the $H_2$ and CO charged and consumed were 175 and 225 cc. per cubic meter of gas. The water layer yield was found to be equivalent to 40 cc. per cubic meter of $H_2$ and CO consumed. The water layer contained 7.9 weight per cent alcohols (calculated as ethanol), had an acid normality of 0.334 showing the presence of organic acids, and had a carbonyl molarity (calculated as acetone) of 0.192 showing the presence of ketones and aldehydes. The hydrocarbon layer containing a minor portion of hydrocarbon-soluble oxygenated hydrocarbons had a specific gravity at 20° C./4° C. of 0.795 and a bromine number of 56. The selectivity was found to be 70.6.

*Example V*

A mixture comprising a major portion of $Fe_2O_3$ in the form of gamma oxide crystals and 10.00 weight per cent $K_2O$ (added as $K_2CO_3$) prepared and reduced as described in Examples I and II was used as a synthesis catalyst. Synthesis gas comprising 97.2% CO and $H_2$ in a ratio of 1.22:1 was passed over the catalyst at a feed rate of 343 volumes per volume of catalyst per hour, a temperature of 550° F., and a pressure of 150 pounds per square inch gauge. The yields of $C_4$ and heavier products based on the $H_2$ and CO charged and consumed were respectively 168 and 225 cc. per cubic meter of gas. A selectivity of 75.5 was obtained.

*Example VI*

A mixture of $H_2$ and CO in a ratio of 1.22:1 was passed over reduced gamma iron oxide catalyst containing before reduction 4.0 weight per cent $K_2O$ (added as $K_2CO_3$) at a rate of 317 volumes per volume of catalyst per hour, a temperature of 675° F., and a pressure of 150 pounds per square inch gauge. Yields of $C_4$ and heavier products were 128 and 177 cc. per cubic meter of $H_2$ and CO charged and consumed, respectively. The selectivity was 59.4. The catalyst was prepared and reduced in accordance with the procedures described in Examples I and II and showed before reduction the typical X-ray diffraction pattern of gamma ferric oxide.

Example VII

A sample of $Fe_3O_4$ was treated by the procedure described in Example I with the exception that no $K_2CO_3$ was added as promoter. After reduction of the pelleted catalyst as described in Example II, $H_2$ and CO (1.22:1 ratio) was passed over the catalyst at a rate of 215 volumes per volume of catalyst per hour, a pressure of 150 pounds per square inch gauge, and a temperature of 600° F. $C_4$ and heavier product yields on the $H_2$ and CO charged and consumed were respectively 91 and 110 cc. per cubic meter of gas. The selectivity was only 40.2. The X-ray diffraction pattern of the unpromoted iron oxide before reduction was identical to a standard alpha $Fe_2O_3$ pattern.

Example VIII

A first catalyst sample containing 0.2% $K_2O$ (added as $K_2CO_3$) and comprising predominantly alpha iron oxide was reduced as described in Example II. Synthesis gas having $H_2$ and CO in the ratio of 1.22:1 was passed over the catalyst at a temperature of 650° F., a pressure of 150 pounds per square inch gauge and a feed rate of 244 volumes per volume of catalyst per hour. The yields of $C_4$ and heavier product were 112 and 124 cc. per cubic meter of $H_2$ and CO charged and consumed, respectively, with a selectivity of 43.2. The hydrocarbon layer contained approximately 0.5 weight per cent of OH and the alcohols present were chiefly $C_3$ and heavier. The water layer contained approximately 1.5% alcohol calculated as ethyl alcohol.

A second catalyst sample containing 1.0% $K_2O$ (added as $K_2CO_3$) and comprising predominantly a mixture of alpha and gamma iron oxides was reduced as described in Example II. Synthesis gas having $H_2$ and CO in the ratio of 1.22:1 was passed over the catalyst at a temperature of 650° F., a pressure of 150 lbs. per square inch gauge and a feed rate of 290 volumes per volume of catalyst per hour. Yields of $C_4$ and heavier product of 165 and 191 cc. per cubic meter of $H_2$ and CO charged and consumed, respectively, with a selectivity of 65.4 were obtained. The hydrocarbon layer contained approximately 2 weight per cent OH. The water layer contained 7.6 weight per cent of alcohol calculated as ethyl alcohol. It will be seen that the second catalyst gave substantially improved results in that it produced higher yields of useful hydrocarbons as well as oxygenated hydrocarbons.

Example IX

Pulverized magnetic black ferroso-ferric oxide was treated with an aqueous $Na_2CO_3$ solution to form a mass which was dried and oxidized by the method described in Example I. The oxidized mass contained 2.0 weight per cent $Na_2CO_3$. After reducing the oxidized mass with dry hydrogen by employing the procedure described in Example II, a mixture of $H_2$ and CO in a ratio of 1:1 was passed over the catalyst at 150 pounds per square inch gauge pressure, 550° F. temperature and 200 volumes per volume of catalyst per hour. A liquid product yield (excluding $C_4$ and heavier product present in the exit gas from the operation) of 140 cc. per cubic meter of charge gas was obtained. A catalyst containing 2.0 weight per cent $K_2O$ (added as $K_2CO_3$) and prepared and reduced as described in Examples I and II was used under the same synthesis conditions described above in this example. A liquid product yield (excluding $C_4$ and heavier product present in the tail gas from the unit) of 120 cc. per cubic meter of charge gas was obtained. It is seen that $Na_2CO_3$ as well as $K_2CO_3$ is an effective promoter and stabilizer of the catalyst mass.

Example X

Pulverized magnetic black ferroso-ferric oxide was treated with varying amounts of a solution of aluminum nitrate, the solution being added as an aqueous solution to portions of the ferroso-ferric oxide to provide catalyst masses, as will be described having varying amounts of aluminum oxide contained therein. The thick pastes resulting from the admixture was mulled and dried in a circulating oven at a temperature of about 225° F. for about 24 hours. During the drying operation it was observed that brownish fumes of nitrogen oxides were being evolved. The dried material, after the aforesaid period, was then pulverized, pilled into $\frac{3}{16}$" pills, heated for about 4½ hours at a temperature of 1000° F. in the presence of air, and cooled in the presence of air. The resulting $Fe_2O_3$ samples containing various amounts of $Al_2O_3$ was then examined by X-ray diffraction procedures well known to the art. The diffraction patterns thus obtained were compared with X-ray diffraction patterns on samples of pure alpha $Fe_2O_3$. The following results were obtained:

| Wt. Per Cent $Al_2O_3$ in Iron Oxides | Results of X-ray Examinations on Promoted Iron Oxides |
|---|---|
| 0 | Standard alpha $Fe_2O_3$ Pattern. |
| 0.5 | Alpha $Fe_2O_3$ plus Additional Lines. |
| 1.0 | Alpha $Fe_2O_3$ only. |
| 2.0 | Do. |
| 5.0 | Do. |

It will be seen from the foregoing table that the ferroso-ferric oxide prepared in the foregoing manner and containing from 0.5 to 5% by weight of added aluminum oxide was in the alpha $Fe_2O_3$ crystalline form after drying and heating under the aforesaid conditions. It will be apparent that the alpha structure was formed under these conditions when aluminum oxide was present. These results are to be compared with the results given in Example I in which potassium oxide was present and in which the X-ray diffraction patterns show that the gamma $Fe_2O_3$ structure was stabilized.

Example XI

In this example catalysts were prepared as described in Example X with the exception that the catalyst contained both aluminum oxide and potassium oxide. In this instance the potassium oxide and aluminum oxide were added as aqueous solutions of potassium carbonate and aluminum nitrate to pulverized magnetic black ferroso-ferric oxide in varying quantities to produce catalysts on treating, as will be described, having different amounts of potassium oxide and aluminum oxide. The thick pastes resulting from admixture of the oxide and the aqueous solutions were mulled and dried in a circulating oven at a temperature of about 225° F. for about 24 hours. Evolution of nitrogen oxide fumes was observed during the drying operation. The dried material was then pulverized, pelleted into $\frac{3}{16}$" pills, heated for about 4½ hours at a temperature of 1000° F. in the presence of air, and cooled in the presence of air. The resulting $Fe_2O_3$ samples containing various amounts of $K_2CO_3$ (reported as $K_2O$, and aluminum oxide were then examined by X-ray diffraction procedures similar to those in Examples I and X and which are well known to the art. The diffraction patterns obtained are given in the following table:

| Wt. Per Cent $K_2O$ in Iron Oxides | Wt. Per Cent $Al_2O_3$ in Iron Oxides | Results of X-ray Examinations on Promoted Iron Oxides |
|---|---|---|
| 0.2 | 5.0 | Standard alpha $Fe_2O_3$ Pattern plus few Additional lines. |
| 0.2 | 0.2 | Alpha $Fe_2O_3$. |
| 1.0 | 1.0 | Gamma $Fe_2O_3$+alpha $Fe_2O_3$. |
| 5.0 | 0.0 | Do. |

It will be seen from the results in the foregoing table that the X-ray diffraction patterns show that when 5% by weight of aluminum oxide is present and 0.2% of potassium oxide is present, the alpha $Fe_2O_3$ structure prevails, but as the content of potassium oxide increases to above 1.0%, the structure of the iron oxide is changed to the gamma $Fe_2O_3$ structure which is the desirable form for use in the practice of the present invention.

*Example XII*

In order to illustrate further, the desirability of employing the alkali metal compounds as stabilizers in distinction to varying amounts of aluminum oxide as stabilizers, a number of runs were made under the conditions given in Example II in which the catalysts containing varying amounts of aluminum oxide were reduced in the presence of dry hydrogen gas for about 4 hours at a temperature of 900° F. at atmospheric pressure, the hydrogen feed rate being maintained at 1000 volumes per volume of catalyst (iron oxide containing aluminum oxide) per hour. The feed mixture comprising hydrogen and carbon monoxide in a ratio of 1:1 was passed over the catalyst at a feed rate varying from 200 to 300 volumes per volume of catalyst per hour and at a pressure of 150 per square inch. The temperature of the catalyst bed was controlled at 550° F. The products were segregated into a water phase, a liquid phase comprising hydrocarbons and oxygenated hydrocarbons, and a gaseous phase comprising unreacted feed $CO_2$ and gaseous hydrocarbons. The yield data for the catalyst containing from 0 to 5% by weight of aluminum oxide are given in the following table:

| Per Cent $Al_2O_3$ | Total Yields, cc./M.³ of $CO+H_2$ | |
|---|---|---|
| | Charge | Consumed |
| 0 | 65 | 95 |
| 1 | 90 | 110 |
| 2 | 100 | 120 |
| 5 | 55 | 75 |

It will be noted from the foregoing table that with a catalyst such as described in Example XII containing no aluminum oxide, the yields of hydrocarbons and oxygenated compounds in cc.'s per cubic meter of carbon monoxide and hydrogen charged and consumed were very small. It will be seen that increasing amounts of aluminum oxide in the catalyst increased the yields slightly when 1 and 2% of aluminum oxide were present but when 5% by weight of aluminum oxide were present in the catalyst, lesser quantities of hydrocarbons and oxygenated organic compounds were produced. The results obtained in the example may be compared with the results obtained in Examples II, III, IV, V, VIII, and IX, inclusive. On comparison it will be observed that the presence of potassium oxide as a stabilizer for the gamma iron oxide structure gives appreciably higher yields than the presence of aluminum oxide in a catalyst which before reduction has an alpha iron oxide structure.

We do not wish to be bound by any specific theory in explanation of the results obtained by the practice of the present invention. It is to be emphasized that it is essential in the practice of the present invention that the iron oxide employed as a catalyst have as an intermediate step in the process of its manufacture the step of intermediate formation of gamma $Fe_2O_3$ crystals.

By way of hypothesis in explaining the advantages resulting from the practice of the present invention, it may be stated that it is believed that superior catalysts usually consist of extremely fine crystals which afford an enhanced surface area. In the prior art wherein alpha ferric oxide crystals were reduced to form the catalyst, it is to be expected that the direct reduction of the relatively large ferric oxide crystals would yield relatively large iron crystals or lower iron oxide crystals. On the other hand, it is known that the crystalline structure of $Fe_3O_4$ and gamma $Fe_2O_3$ are closely similar. X-ray diffraction data demonstrate that the gamma $Fe_2O_3$ crystals formed as an intermediate phase consist of extremely fine crystals of a size well below the upper limit of the colloidal range of particle size. It is believed that the stabilizing compounds selected from the group containing an element of alkali metals engenders and stabilizes the gamma ferric oxide structure which after reduction results in a catalyst of higher activity and selectivity than heretofore obtained from iron oxides.

While specific temperature ranges to which the catalyst should be heated in the presence of oxygen and in the presence of hydrogen are given in the range between 750° to 1400° F., actually this temperature may vary widely within the range given. For example, at 750° F., the catalyst may be subjected to heat treatment in the presence of oxygen and a reduction treatment in the presence of hydrogen for about 24 hours whereas at intermediate temperatures in this range, the time of contact will be considerably less. For example, at around 1000° F., the time of approximately 4½ hours should be sufficient whereas at higher temperatures of approximately 1400° F., a considerably shorter time will be required which may be as little as 10 to 30 minutes. If higher temperatures than 1400° F. are exceeded, there is danger of the gamma iron oxide containing the promoter reverting to an undesirable form. At temperatures as high as 1600° F. the stabilizing effect of the alkali metal compounds may be lost.

Although specific examples illustrating the practice of the present invention have been given, these examples are for illustrative purposes only and are not intended to limit the scope of the invention. It is to be understood that the present invention is directed to a method for obtaining hydrocarbons and oxygenated organic compounds involving contracting a mixture of CO and $H_2$ at suitable temperatures and pressures with a catalyst which, before reduction, comprised a major portion of $Fe_2O_3$ in the form of gamma oxide crystals and a minor portion of an alkali metal compound stabilizer. It will be apparent to a worker skilled in the art that while specific examples of preferred temperature and pressure ranges for conducting the operation have been given, other conditions may at times be desirable and may be employed without departing from the scope of the invention.

It should be pointed out that although the improved catalyst ordinarily is prepared from ferroso-ferric oxide, it also may be prepared from alpha iron oxide which may be in the form of mill scale, pyrites ash, and hematite ore. Since alpha $Fe_2O_3$ cannot be converted directly to gamma $Fe_2O_3$, it is first necessary to reduce the alpha oxide to the lower oxide $Fe_3O_4$ by employing reducing agents such as hydrogen and mixtures of hydrogen and steam at elevated temperatures. After the alpha $Fe_2O_3$ has been reduced to $Fe_3O_4$, a promoter such as one of the alkali metal oxides may then be added thereto and the active catalyst may be prepared as heretofore described; namely, oxidized to gamma $Fe_2O_3$ and then the gamma form reduced to the active catalyst. Although it will generally be preferable to add the promoter to the reduced alpha $Fe_2O_3$, it may be desirable in some cases to add the promoter to the alpha $Fe_2O_3$ before the preliminary reduction step.

Having fully described and illustrated the practice of the present invention, what we desire to claim as new and useful and to secure by Letters Patent is:

1. A method for preparing a catalyst adapted for use in a Fischer-Tropsch synthesis consisting of the steps of preparing an admixture of $Fe_3O_4$ and an amount in the range between 1% and 15% by weight calculated as the oxide of a compound selected from the group consisting of the oxides, hydroxides and carbonates of the alkali metals, heating said admixture in the presence of a free oxygen-containing gas at a temperature in the range between 750° and 1400° F. to convert the major portion of said $Fe_3O_4$ to $Fe_2O_3$ in the gamma crystalline form and subsequently contacting said heated admixture with a reducing atmosphere at a temperature in the range between 750° and 1400° F. for a time ranging from 10 minutes to 24 hours.

2. A method for preparing a catalyst suitable for use in Fischer-Tropsch synthesis comprising the steps of preparing an admixture of $Fe_3O_4$ in the form of powder and a sufficient amount of solution to provide a catalyst containing an amount in the range between 1% and 15% by weight calculated as the oxide of a compound selected from the group consisting of the oxides, hydroxides and carbonates of the alkali metals to form an aqueous paste, drying said paste to form a solid cake, heating the cake in the presence of a free oxygen containing gas at a temperature in the range between 750° and 1400° F. to convert at least a major portion of the $Fe_3O_4$ to $Fe_2O_3$ in the gamma crystalline form and subsequently subjecting the heated cake to a reducing atmosphere at a temperature in the range between 750° and 1400° F. for a time ranging from 10 minutes to 24 hours.

3. A method for producing a catalyst suitable for use in the Fischer-Tropsch synthesis comprising the steps of admixing $Fe_3O_4$ in the form of powder and a sufficient amount of solution to provide a catalyst containing an amount in the range between 1% and 15% by weight calculated as the oxide of a compound selected from the group consisting of the oxides, hydroxides and carbonates of the alkali metals to form an aqueous paste, drying the paste to form a solid cake, heating the cake in the presence of a free oxygen-containing gas at a temperature of the order of 1000° F. to convert at least a major portion of the $Fe_3O_4$ to $Fe_2O_3$ in the gamma crystalline form and subsequently subjecting the heated cake to a reducing atmosphere at a temperature of 900° F. for about 4 hours.

4. A method adapted for preparing a catalyst for use in a Fischer-Tropsch synthesis consisting of the steps of preparing an admixture of $Fe_3O_4$ and an amount in the range between 2 and 5% by weight calculated as the oxide of a compound selected from the group consisting of the oxides, hydroxides and carbonates of the alkali metals, heating said admixture in the presence of a free oxygen-containing gas at a temperature of approximately 1000° F. to convert the major portion of said $Fe_3O_4$ to $Fe_2O_3$ in the gamma crystalline form and subsequently contacting said heated mixture with a reducing atmosphere at a temperature of approximately 90° F. for about 4 hours.

WINFRED O. MILLIGAN.
JAMES C. SCHILLER.

REFERENCES CITED

The following references are of record in the file of this patent:

UNITED STATES PATENTS

| Number | Name | Date |
| --- | --- | --- |
| 2,183,145 | Michael et al. | Dec. 12, 1939 |
| 2,461,147 | Davies et al. | Feb. 8, 1949 |
| 2,465,314 | Mosesman | Mar. 22, 1949 |
| 2,470,784 | Mosesman | May 24, 1949 |
| 2,530,998 | Schaman | Nov. 21, 1950 |

OTHER REFERENCES

Le Clerc: "Comptes Rendus," vol. 207 (1938), pp. 1099–1101.